United States Patent [19]

Cline

[11] Patent Number: 4,671,558
[45] Date of Patent: Jun. 9, 1987

[54] ROLLABLE SUNSHIELD FOR VEHICLES
[75] Inventor: Thomas L. Cline, Hanover, Pa.
[73] Assignee: Tim-Bar Corporation, Hanover, Pa.
[21] Appl. No.: 896,404
[22] Filed: Aug. 13, 1986
[51] Int. Cl.⁴ ............................................... B60J 3/00
[52] U.S. Cl. ................................ 296/97 R; 296/97 E;
160/DIG. 2
[58] Field of Search ................ 296/97 R, 97 E, 95 C,
296/84 R; 160/DIG. 2, DIG. 3

[56] References Cited
U.S. PATENT DOCUMENTS 3,874,437 4/1975 Black ................................ 296/95 C
4,202,396 5/1980 Levy ................................ 296/97 R
4,560,245 12/1985 Sarner ................................ 296/97 D Primary Examiner—Robert R. Song
Attorney, Agent, or Firm—Daniel J. O'Connor

[57] ABSTRACT

A vehicle sunshield fabricated of a rollable single face corrugated fiberboard material with printed material applied to one side thereof. The one-piece design includes left and right sections or zones which are structured to be held in place by the conventional pivotable visors used in automotive vehicles. The one-piece design further includes a central section or zone (22) which has formed at the top thereof a mirror cutout portion and a reduced width mirror post cutout portion to aid in the ease of installation and use of the device.

1 Claim, 2 Drawing Figures

ROLLABLE SUNSHIELD FOR VEHICLES

BACKGROUND AND OBJECTS OF THE INVENTION

This invention relates generally to devices for placement on the interior windshield of an automobile to reflect the sun's rays and to serve as an aid in keeping the automobile interior from excessive heat build-up.

Besides being uncomfortable for passengers, the sun's rays and excessive heat build-up tend to damage a car's interior by cracking seat covers and reducing resale value.

Prior art systems have used foldable reflectors of various materials including plastics layers, cardboard and double face corrugated fiberboard.

The prior art systems have proven to be relatively complex and expensive for the simple sun reflecting task to be performed. Typically, they require numerous fasteners or a complicated score line folding pattern to enable them to be folded back into a portable and storable position.

In more recent years, automobile sun shields have had printed material applied to an exteriorly visible surface. The printed material may promote a particular product or simply be decorative.

The inventors herein have realized that a simpler reflector design could be more economically sold, be easier to use by the average consumer and be less damaging and detracting to the printed material on the face of the automobile sunshield.

Accordingly, it is an object of the invention to provide an automobile sunshield fabricated of single face corrugated fiberboard material which may be simply rolled open into its desired sun reflecting position in the automobile interior.

It is a further object to provide that the corrugated layer of the sunshield be arranged such that the corrugations are perpendicular to the ground upon installation of the device.

It is a still further object of the invention to provide a sunshield having no interiorly positioned fold lines which tend to distort any printed material placed on the outer surface of the sunshield.

It is a further object to provide a sunshield having a mirror receiving cut-out and a mirror post receiving cut-out formed in an upper central portion of the shield to aid in the installation and use of the device.

It is a further object to supply a single standard sized rollable sunshield which is readily usable and unrollable and which may be used for any size automotive windshield.

These and other advantageous objects of the invention will become apparent to those of skill in the art from the description which follows and from the drawings included herewith.

PRIOR ART PATENTS

The most relevant prior art patented systems known to applicant are listed as follows: U.S. Pat. Nos. 2,925,302 issued to Bosch on Feb. 16, 1960; 3,880,461 issued to Flanagan on Apr. 29, 1975; 4,005,899 issued to Rigney on Feb. 1, 1977; 4,202,396 issued to Levy on May 13, 1980; 3,425,176 issued to Cairns on Feb. 4, 1969; 4,399,347 issued to Schmitt on Aug. 16, 1983.

The first four cited patents issued to Bosch, Flanagan, Rigney and Levy respectively illustrate the relatively complex folding patterns used in prior art systems to accomplish storage of a vehicle sunshield apparatus. In contrast, the present invention utilizes a rollable design which greatly reduces weight and manufacturing costs while accomplishing the desired ease of storage and use functions.

The cited patents issued to Cairns and Schmitt illustrate flexible plastic prior art designs which are relatively expensive to manufacture and use in comparison to the design of the present invention. Designs such as those of Cairns and Schmitt further require complex and expensive fastening means and do not include the vertical structural rigidity which is advantageously used in the present invention design.

BRIEF DESCRIPTION OF THE DRAWING FIGURES

FULL DESCRIPTION OF THE PREFERRED EMBODIMENT

Figure 1:
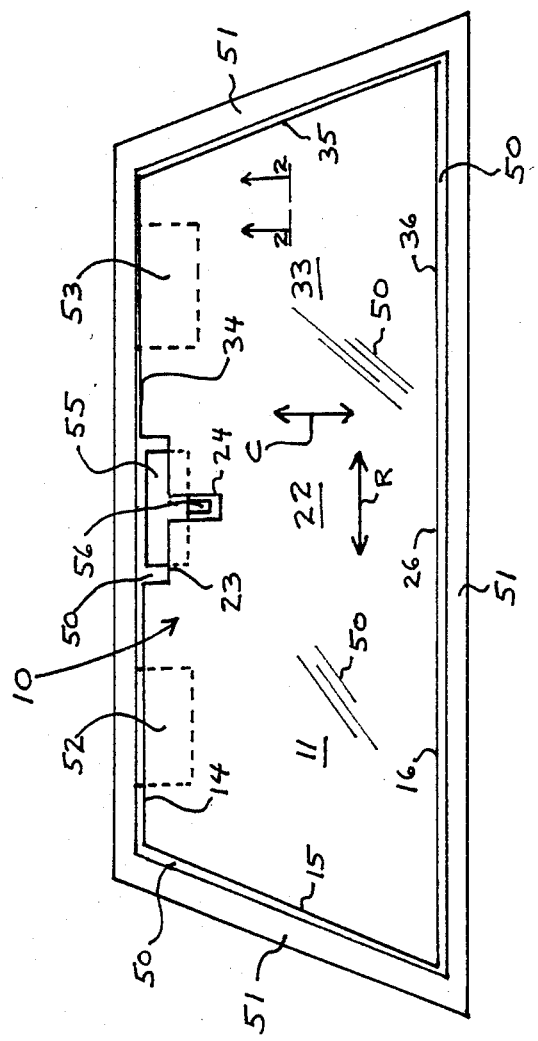
FIG. 1 is a front plan view illustrating the use of the invention device in conjunction with an automobile windshield.

Referring now to FIG. 1, there is shown a conventional automobile windshield 50 supported in place by windshield frame elements 51. Conventional interior vehicle pivotable visors 52 and 53 are also shown. Mirror 55 and a mirror support post 56 are further illustrated in FIG. 1, it being noted that the mirror support post 56 on many current vehicle designs is adhesively secured to the inside of an automobile windshield.

The sunshield 10 of the present invention consists of a one-piece horizontally rollable sheet of single face corrugated fiberboard material.

As shown in FIG. 1, the sunshield 10, although formed as a one-piece rollable element, has three critical zones or sections formed thereon. A first or left zone 11 has an upper ridge 14 sized to extend near the top of windshield 50 so that it may be retained in a desired sun blocking position by the conventional vehicle visor 52. As shown, a lower edge 16 of the first zone 11 extends to near the bottom of windshield 50 while a tapered side edge 15 is sized so as to conform to the tapered windshield support frames 51 found in most currently manufactured automobiles.

As further shown in FIG. 1, a third or right zone 33 of the sunshield is sized in the same manner as the first zone 11 having a lower edge 36, an upper edge 34 for retention by the conventional pivotable visor 53 and a tapered side edge 35 to again conform to the tapered windshield frame 51.

A second or middle zone 22 of the sunshield 10 includes a lower edge portion 26 which extends near the bottom of windshield 50. This middle zone 22 has a widened cutout section 23 and a relatively narrower cutout section 24 formed therebelow. The cutout sections formed in middle zone 22 allow the device to be easily rolled out and positioned with respect to the mirror 55 and the mirror support post 56 conventionally used on vehicles.

Thus, the sunshield of the present invention can be easily unrolled from its storage position in right and left directions shown at arrows R and easily placed between a vehicle rear view mirror and the inside of the vehicle windshield. The presence of mirror 55 and mirror support post 56 is taken into account by cutout sections 23 and 24 respectively. As shown, the mirror 55 and post 56 aid in the support of the sunshield against the windshield 50 upon installation. As before noted, the sunshield 10 is designed so that the conventional pivotable visors 52 and 53 further support the sunshield 10 in its desired sun blocking position.

Figure 2:
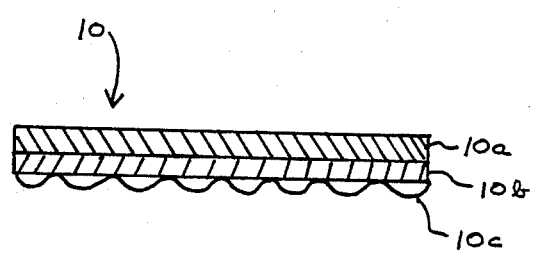
FIG. 2 is a view along lines 2—2 of FIG. 1 illustrating the layered construction of the present invention.

The unique layered paperboard construction of the present invention is shown in FIG. 2, a view along lines 2—2 of the sunshield 10 shown in FIG. 1.

As shown in FIG. 2, the first or outwardly facing layer 10a comprises a paperboard layer of printed advertising or decorative material. A middle layer 10b also is comprised of a flat paperboard material to which the printed layer is adhesively secured. A third layer 10c, which faces toward the vehicle interior upon installation, is comprised of corrugated paperboard and is adhesively secured to the middle paperboard layer 10b.

As will be appreciated from the construction shown in FIGS. 1 and 2, the corrugations of layer 10c are arranged in the device so as to run vertically as shown at arrows C of FIG. 1 so that the overall device has substantial vertical rigidity upon installation. The arrangement of the corrugated layer 10c also allows the overall device to be easily rolled out to the right and left as shown by arrows R in FIG. 1 as an aid in proper placement of the sunshield 10 in its desired sun blocking position.

The rollable features of the present invention result in a printed panel 10a which is free of distorting fold lines found in systems of the prior art. Ease of installation and use is accomplished by the one-piece design. The sunshield 10 of the present invention, by using paperboard materials, may be very economically manufactured and shipping costs greatly reduced by reason of the low weight paperboard materials. Simultaneously, a device of high structural integrity and ease of use is yieldable from the novel design of the present invention.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

I claim:

1. In combination with an automobile windshield (50) having a windshield supporting frame (51) therearound and a rear view mirror (55) and rear view mirror supporting post (56) associated therewith, said windshield further having two pivotable visor means (52, 53) associated therewith, a sunshield means (10) for blocking the entrance of sunlight into a vehicle at selected times, said sunshield means (10) comprising a flat paperboard layer (10b) and an inner layer (10c) comprised of corrugated paperboard wherein said layers (10b, 10c) are adhesively secured together, means whereby said combined layers (10b, 10c) are rollable along a direction (R) of the automobile windshield, wherein said combined layers (10b, 10c) have a first zone (11) formed thereon, a second middle zone (22) formed thereon, and a third zone (33) formed thereon, wherein said first zone (11) has an upper ridge means (14) sized to extend to a top of windshield (50) and adapted to be held in place against an interior portion of said windshield by one of said pivotable visor means (52), wherein said third zone (33) has an upper ridge means (34) sized to extend to a top of windshield (50) and adapted to be held in place against an interior portion of said windshield by the other of said pivotable visor means (53), wherein said second middle zone (22) has a widened cutout portion means (23) to aid in installation of the sunshield in a vehicle, wherein said second zone (22) has a narrow cutout portion means (24) formed thereon beneath said widened cutout portion (23) to further aid in installation of the sunshield in a vehicle(.), wherein said widened cutout portion means (23) is located at the top of said second middle zone (22) and serves to allow the sunshield to be positioned relative to said rear view mirror (55), wherein said sunshield (10) includes a layer (10a) of printed paperboard material which is adhesively attached to said flat paperboard layer (10b) on a side thereof opposite said corrugated paperboard layer (10c), wherein said corrugated paperboard layer means (10c) is arranged such that corrugations thereon extend in a substantially vertical direction (c) to add vertical rigidity to the sunshield upon installation, wherein said sunshield means (10) has no fold lines formed thereon such that the printed paperboard layer (10a) is not distorted upon installation of the sunshield in relation to a vehicle windshield (50), wherein said first and third zones (11, 33) of said sunshield have tapered side edges (15, 35) formed thereon to correspond to a standard windshield shape, wherein said sunshield (10) is rollable along a horizontal direction (R) without the use of fold lines for installation or storage.

* * * * *